(12) United States Patent
Liu et al.

(10) Patent No.: US 8,253,701 B2
(45) Date of Patent: Aug. 28, 2012

(54) TOUCH PANEL, METHOD FOR MAKING THE SAME, AND DISPLAY DEVICE ADOPTING THE SAME

(75) Inventors: Chang-Hong Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 950 days.

(21) Appl. No.: 12/286,219

(22) Filed: Sep. 29, 2008

(65) Prior Publication Data
US 2009/0153513 A1 Jun. 18, 2009

(30) Foreign Application Priority Data
Dec. 14, 2007 (CN) .......................... 2007 1 0125110

(51) Int. Cl.
*G89G 5/00* (2006.01)
(52) U.S. Cl. ........................................................ 345/173
(58) Field of Classification Search ................. 345/173, 345/174, 1.1; 73/774; 174/94 R; 349/123, 349/124, 128; 313/497, 311, 310, 309; 381/164, 381/426; 428/1.4, 297.4, 411.1; 205/159
See application file for complete search history.

(56) References Cited

U.S. PATENT DOCUMENTS

| | | |
|---|---|---|
| 4,659,873 A | 4/1987 | Gibson et al. |
| 4,922,061 A | 5/1990 | Meadows et al. |
| 4,933,660 A | 6/1990 | Wynne, Jr. |
| 5,181,030 A | 1/1993 | Itaya et al. |
| 5,853,877 A | 12/1998 | Shibuta |
| 5,861,583 A | 1/1999 | Schediwy et al. |
| 6,373,472 B1 | 4/2002 | Palalau et al. |
| 6,423,583 B1 | 7/2002 | Avouris et al. |
| 6,628,269 B2 | 9/2003 | Shimizu |
| 6,629,833 B1 | 10/2003 | Ohya et al. |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,071,927 B2 | 7/2006 | Blanchard |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8)(lines from the 4th line to 35th line in the right col. of p. 507 may be relevant).

(Continued)

*Primary Examiner* — Nabil Hindi
(74) *Attorney, Agent, or Firm* — Altis Law Group, Inc.

(57) ABSTRACT

A touch panel includes a substrate, a transparent conductive layer, and at least two separate electrodes. The transparent conductive layer is formed on a surface of the substrate. The transparent conductive layer includes a carbon nanotube structure comprised of carbon nanotubes, and the carbon nanotubes in the carbon nanotube structure are arranged isotropically, arranged along a same direction, or arranged along different directions. The electrodes are separately located and electrically connected with the transparent conductive layer.

16 Claims, 6 Drawing Sheets

U.S. PATENT DOCUMENTS

| | | | |
|---|---|---|---|
| 7,084,933 B2 | 8/2006 | Oh et al. | |
| 7,194,912 B2 * | 3/2007 | Jordan et al. | 73/774 |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 | 9/2009 | Spath et al. | |
| 7,630,040 B2 * | 12/2009 | Liu et al. | 349/123 |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 7,956,287 B2 * | 6/2011 | Takayama et al. | 174/94 R |
| 2002/0089492 A1 | 7/2002 | Ahn et al. | |
| 2003/0122800 A1 | 7/2003 | Yu | |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kawase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0192014 A1 | 8/2008 | Kent et al. | |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153516 A1 | 6/2009 | Liu et al. | |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 1995-28598 | 1/1995 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |

| | | |
|---|---|---|
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
ASM Handbook."Volume 2 Properties and Selection: Nonferrous Alloys and Special-Purpose Materials".Apr. 2007; pp. 840-853.
Wu et al."Transparent, Conductive Carbon Nanotube Films". Science,vol. 305,(2004);pp. 1273-1276.
Fan et al. "Self-Oriented Regular Arrays of Carbon Nanotubes and Their Field Emission Properties". Science, vol. 283, (1999); pp. 512-514.
Susuki et al. "Investigation of physical and electric properties of silver pastes as binder for thermoelectric materials" Review of Scientific Instruments,76,(2005);pp. 023907-1 to 023907-5.
Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).
George Gruner, "Carbon Nanonets Spark New Electronics", Scientific American, pp. 76-83, May 2007.
Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).
Yoshikazu Nakayama, "Technology Development of CNT Long Yarns and CNT Sheets", Nano Carbon Handbook, Japan TSN INC, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Mei Zhang etal., "Strong Transparent, Multifunctional, Carbon Nanotube Sheets", SCIENCE, America, AAAS, vol. 309, pp. 1215-1219, Aug. 19, 2005.
R Colin Johnson, "Carbon nanotubes aim for cheap, durable touch screens",Aug. 2007 http://psroc.phys.ntu.edu.tw/bimonth/v27/615.pdf.
Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

TOUCH PANEL, METHOD FOR MAKING THE SAME, AND DISPLAY DEVICE ADOPTING THE SAME

RELATED APPLICATIONS

This application is related to commonly-assigned applications entitled, "TOUCH PANEL", filed Sep. 29, 2008 Ser. No. 12/286,266; "TOUCH PANEL", field Sep. 29, 2008 Ser. No. 12/286,141; "TOUCH PANEL AND DISPLAY DEVICE USING THE SAME", filed Sep. 29, 2008 Ser. No. 12/286,189; "TOUCH PANEL AND DISPLAY DEVICE USING THE SAME", filed Sep. 29, 2008 Ser. No. 12/286,181; "TOUCH PANEL AND DISPLAY DEVICE USING THE SAME", filed Sep. 29, 2008 Ser. No. 12/286,176; "TOUCH PANEL AND DISPLAY DEVICE USING THE SAME", filed Sep. 29, 2008 Ser. No. 12/286,166; "TOUCH PANEL AND DISPLAY DEVICE USING THE SAME", filed Sep. 29, 2008 Ser. No. 12/286,178; "TOUCH PANEL AND DISPLAY DEVICE USING THE SAME", filed Sep. 29, 2008 Ser. No. 12/286,148; "TOUCHABLE CONTROL DEVICE", filed Sep. 29, 2008 Ser. No. 12/286,140; "TOUCH PANEL AND DISPLAY DEVICE USING THE SAME", filed Sep. 29, 2008 Ser. No. 12/286,154; "TOUCH PANEL AND DISPLAY DEVICE USING THE SAME", filed Sep. 29, 2008 Ser. No. 12/286,216; "TOUCH PANEL AND DISPLAY DEVICE USING THE SAME", filed Sep. 29, 2008 Ser. No. 12/286,152; "TOUCH PANEL AND DISPLAY DEVICE USING THE SAME", filed Sep. 29, 2008 Ser. No. 12/286,145; "TOUCH PANEL, METHOD FOR MAKING THE SAME, AND DISPLAY DEVICE ADOPTING THE SAME", filed Sep. 29, 2008 Ser. No. 12/286,155; "TOUCH PANEL AND DISPLAY DEVICE USING THE SAME", filed Sep. 29, 2008 Ser. No. 12/286,179; "TOUCH PANEL, METHOD FOR MAKING THE SAME, AND DISPLAY DEVICE ADOPTING THE SAME", filed Sep. 29, 2008 Ser. No. 12/286,228; "TOUCH PANEL AND DISPLAY DEVICE USING THE SAME", filed Sep. 29, 2008 Ser. No. 12/286,153; "TOUCH PANEL AND DISPLAY DEVICE USING THE SAME", filed Sep. 29, 2008 Ser. No. 12/286,184; "METHOD FOR MAKING TOUCH PANEL", filed Sep. 29, 2008 Ser. No. 12/286,175; "METHOD FOR MAKING TOUCH PANEL", filed Sep. 29, 2008 Ser. No. 12/286,195; "TOUCH PANEL AND DISPLAY DEVICE USING THE SAME", filed Sep. 29, 2008 Ser. No. 12/286,160; "TOUCH PANEL AND DISPLAY DEVICE USING THE SAME", filed Sep. 29, 2008 Ser. No. 12/286,220; "TOUCH PANEL AND DISPLAY DEVICE USING THE SAME", filed Sep. 29, 2008 Ser. No. 12/286,227; "TOUCH PANEL AND DISPLAY DEVICE USING THE SAME", filed Sep. 29, 2008 Ser. No. 12/286,144; "TOUCH PANEL AND DISPLAY DEVICE USING THE SAME", filed Sep. 29, 2008 Ser. No. 12/286,218; "TOUCH PANEL AND DISPLAY DEVICE USING THE SAME", filed Sep. 29, 2008 Ser. No. 12/286,141; "TOUCH PANEL AND DISPLAY DEVICE USING THE SAME", filed Sep. 29, 2008 Ser. No. 12/286,241; "TOUCH PANEL, METHOD FOR MAKING THE SAME, AND DISPLAY DEVICE ADOPTING THE SAME", filed Sep. 29, 2008 Ser. No. 12/286,151; "ELECTRONIC ELEMENT HAVING CARBON NANOTUBES", filed Sep. 29, 2008 Ser. No. 12/286,143; and "TOUCH PANEL AND DISPLAY DEVICE USING THE SAME", filed Sep. 29, 2008 Ser. No. 12/286,146. The disclosures of the above-identified applications are incorporated herein by reference.

BACKGROUND

1. Field of the Invention

The present invention relates to a carbon nanotube based touch panel, a method for making the same, and a display device adopting the same.

2. Discussion of Related Art

Following the advancement in recent years of various electronic apparatuses, such as mobile phones, car navigation systems and the like toward high performance and diversification, there has been continuous growth in the number of electronic apparatuses equipped with optically transparent touch panels at the front of their respective display devices (e.g., a display such as a liquid crystal panel). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including a resistance-type, a capacitance-type, an infrared-type, and a surface sound wave-type, have been developed. Capacitance-type touch panels have several advantages, such as high accuracy and strong anti-jamming ability, and thus have been widely used.

A conventional capacitance-type touch panel includes a glass substrate, an optically transparent conductive layer, and four electrodes. The material of the transparent conductive layer is typically selected from a group consisting of indium tin oxide (ITO) and antimony tin oxide (ATO). The electrodes are made of metal and separately formed on a surface of the transparent conductive layer. Further, a transparent protective layer is formed on the surface of the transparent conductive layer that faces away from the substrate. The material of the transparent protective layer has insulative layer and transparent characteristics.

In operation, an upper surface of the touch panel is pressed/touched with a touch tool, such as a user's finger, or an electrical pen/stylus. Concordantly, visual observation of a screen on the liquid crystal display device provided on a back side of the touch panel is allowed. In use, due to an electrical field of the user, a coupling capacitance forms between the user and the transparent conductive layer. For high frequency electrical current, the coupled capacitance is a conductor, and thus the touch tool takes away a little current from the touch point. Current flowing through the four electrodes cooperatively replaces the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

However, the optically transparent conductive layer (e.g., ITO layer) is generally formed by means of ion-beam sputtering, and this method is relatively complicated. Furthermore, the ITO layer has generally poor mechanical durability, low chemical endurance and uneven resistance over an entire area of the touch panel. Additionally, the ITO layer has relatively low transparency. All the above-mentioned problems of the ITO layer tend to yield a touch panel with low sensitivity, accuracy, and brightness.

What is needed, therefore, is to provide a durable touch panel with high sensitivity, accuracy, and brightness, a method for making the same, and a display device adopting the same.

SUMMARY

A touch panel includes a substrate, a transparent conductive layer, and at least two separate electrodes. The transparent conductive layer is formed on a surface of the substrate. The transparent conductive layer includes a carbon nanotube structure, and the carbon nanotube structure comprises a plurality of carbon nanotubes arranged isotropically, arranged along a same direction, or arranged along different directions. The electrodes are separately located and are electrically connected with the transparent conductive layer.

Other advantages and novel features of the present touch panel, method for making the same, and display device adopting the same will become more apparent from the following detailed description of the present embodiments when taken in conjunction with the accompanying drawings.

BRIEF DESCRIPTION OF THE DRAWINGS

Many aspects of the present touch panel, method for making the same, and display device adopting the same can be better understood with reference to the following drawings. The components in the drawings are not necessarily to scale, the emphasis instead being placed upon clearly illustrating the principles of the present touch panel, method for making the same, and display device adopting the same.

DETAILED DESCRIPTION OF EXEMPLARY EMBODIMENTS

Reference will now be made to the drawings to describe, in detail, embodiments of the present touch panel, method for making the same, and display device adopting the same.

Figure 1:
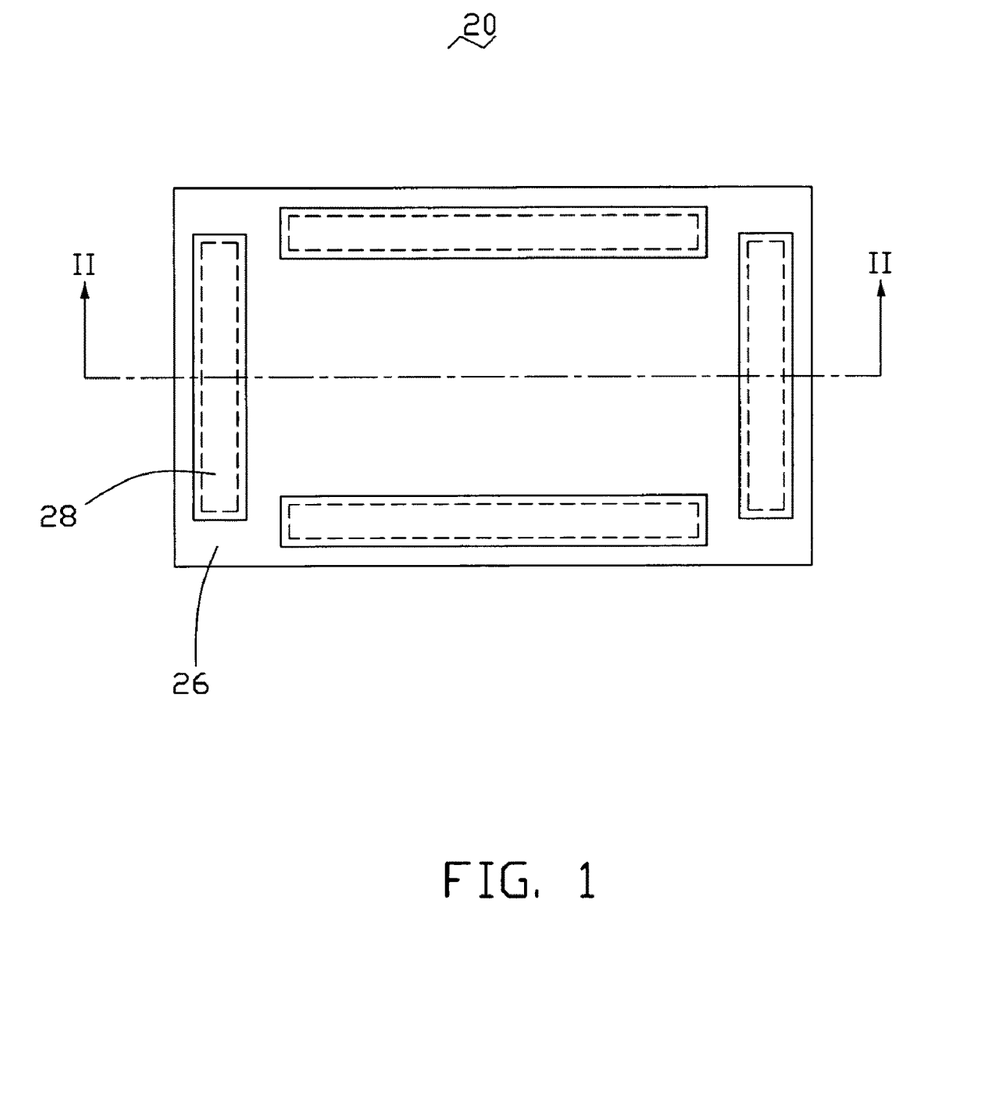
FIG. 1 is a schematic view of a partially assembled touch panel, in accordance with a present embodiment.
Figure 2:
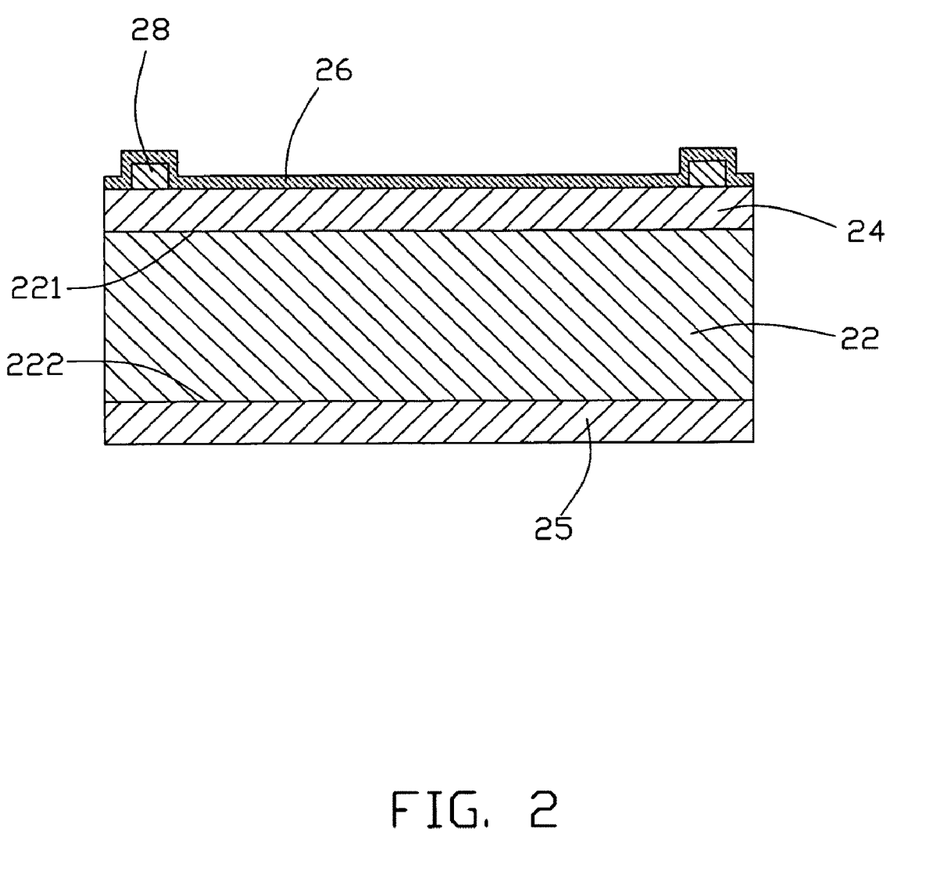
FIG. 2 is a cross-sectional schematic view of the touch panel of FIG. 1, taken along a line II-II of FIG. 1.

Referring to FIGS. 1 and 2, a touch panel 20 includes a substrate 22, a transparent conductive layer 24, a transparent protective layer 26, and at least two electrodes 28. The substrate 22 has a first surface 221 and a second surface 222 at opposite sides thereof respectively. The transparent conductive layer 24 is located on the first surface 221. The electrodes 28 are separately located adjacent sides of the transparent conductive layer 24 and electrically connected with the transparent conductive layer 24 for forming an equipotential surface on the transparent conductive layer 24. The transparent protective layer 26 covers the electrodes 28 and the exposed surface of the transparent conductive layer 24 that faces away from the substrate 22.

The substrate 22 has a planar structure or a curved structure. The material of the substrate 22 can be selected from the group consisting of glass, quartz, diamond, and plastics. The substrate 22 can be opportunely made from a transparent material, e.g., either flexible or hard/stiff, depending on whether a flexible device is desired or not. The substrate 22 is used to support the transparent conductive layer 24.

The transparent conductive layer 24 includes a carbon nanotube structure. The carbon nanotubes in that carbon nanotube structure are arranged isotropically, arranged along a same direction, or arranged along different directions. An angle between primary alignment direction of the carbon nanotubes and the carbon nanotube structure is 0° to approximately 15°. The carbon nanotube structure can be formed by pressing a carbon nanotube array. The angle is closely related to pressure applied to the carbon nanotube array. The greater the pressure, the smaller the angle. The carbon nanotubes in the carbon nanotube structure can parallel to the surface of the carbon nanotube structure when the angle is 0°. The carbon nanotubes in the carbon nanotube structure are attracted by the van der Waals attractive force therebetween, thereby forming a free-standing structure.

A length and a width of the carbon nanotube structure can be arbitrarily set as desired. A thickness of the carbon nanotube structure approximately ranges from 0.5 nanometers to 100 micrometers. The carbon nanotubes in the carbon nanotube structure can be selected from a group consisting of single-walled carbon nanotubes, double-walled carbon nanotubes, and multi-walled carbon nanotubes. A diameter of each single-walled carbon nanotubes approximately ranges from 0.5 nanometers to 50 nanometers. A diameter of each double-walled carbon nanotubes approximately ranges from 1 nanometer to 50 nanometers. A diameter of each multi-walled carbon nanotubes approximately ranges from 1.5 nanometers to 50 nanometers.

Due to the carbon nanotube structure having good tensile strength, it can be formed into almost any desired shape, and can be used as a transparent conductive layer in a flexible touch panel. As such, the carbon nanotube structure can have a planar or curved structure. Due to the carbon nanotube structure including a plurality of isotropic carbon nanotubes and micropores, the carbon nanotube structure has excellent resistance distribution and light transparence. Thus the touch panel and the display device adopting the same have good accuracy and brightness.

It is to be noted that the shape of the substrate 22 and the transparent conductive layer 24 is chosen according to the requirements of the touch field of the touch panel 22. Generally, the shape of the touch field may be triangular or rectangular. In the present embodiment, the shapes of the touch field, the substrate, and the transparent conductive layer 24 are all rectangular.

Due to the transparent conductive layer 24 being rectangular, four electrodes 28 are needed and are formed on the surface thereof, thereby obtaining an equipotential surface. The substrate 22 is a glass substrate. The four electrodes 28 are strip-shaped, and formed of silver, copper, or an alloy of at least one of such metals. The four electrodes 28 are located directly on a surface of the transparent conductive layer 24 that faces away from the substrate 22. The electrodes 28 can be formed by one or more of spraying, electrical deposition, and electroless deposition methods. Moreover, the electrodes 28 can also be adhered to the surface of the transparent conductive layer 24, e.g., by a silver-substrated slurry.

Further, in order to prolong operational life span and restrict coupling capacitance of the touch panel 20, the transparent protective layer 26 is located on the electrodes 28 and the transparent conductive layer 24. The material of the transparent protective layer 26 can, e.g., be selected from a group consisting of silicon nitride, silicon dioxide, benzocyclobutenes, polyester film, and polyethylene terephthalate. The transparent protective layer 26 can be a slick plastic film and receive a surface hardening treatment to protect the electrodes 28 and the transparent conductive layer 24 from being scratched when in use.

In the present embodiment, the transparent protective layer 26 is silicon dioxide. Hardness and thickness of the transparent protective layer 26 are selected according to practical needs. The transparent protective layer 26 is adhered to the transparent conductive layer 24, e.g., via an adhesive.

The touch panel 20 can further include a shielding layer 25 located on the second surface 222 of the substrate 22. The material of the shielding layer can be indium tin oxide, antimony tin oxide, carbon nanotube structure, or other conductive material. In the present embodiment, the shielding layer 25 is a carbon nanotube structure, and the carbon nanotubes therein are arranged isotropically, arranged along a same direction, or arranged along different directions. The carbon nanotube structure is connected to ground and acts as shield, thus enabling the touch panel 20 to operate without interference (such as electromagnetic interference).

Figure 3:
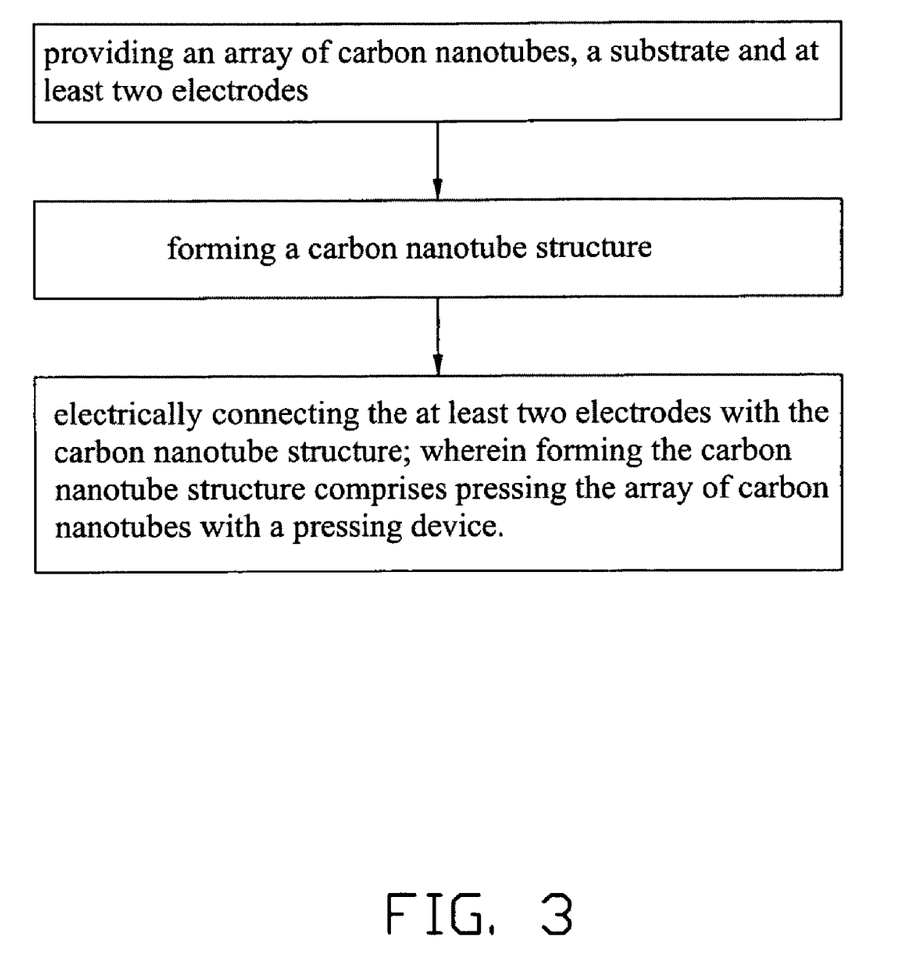
FIG. 3 is a flow chart of a method for making the touch panel shown in FIG. 1.

Referring to FIG. 3, a method for making the above-described touch panel 20 is provided in the present embodiment. The method includes the steps of: (a) providing an array of carbon nanotubes, a substrate 22, and at least two electrodes 28; (b) pressing the array of carbon nanotubes via a pressing device to form a carbon nanotube structure on a first surface of the substrate 22; and (c) electrically connecting the at least two electrodes 28 with the carbon nanotube structure, thereby forming the touch panel.

In step (a), the array of carbon nanotubes is a super-aligned array of carbon nanotubes. The super-aligned array of carbon nanotubes can be formed by the substeps of: (a1) providing a substantially flat and smooth growing substrate; (a2) forming a catalyst layer on the growing substrate; (a3) annealing the growing substrate with the catalyst layer in air at a temperature in the approximate range from 700° C. to 900° C. for about 30 to 90 minutes; (a4) heating the growing substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In the present embodiment, a 4-inch P-type silicon wafer is used as the growing substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array of carbon nanotubes includes a plurality of carbon nanotubes parallel to each other and approximately perpendicular to the substrate. The carbon nanotubes in the array of carbon nanotubes can be selected from a group consisting of single-walled carbon nanotubes, double-walled carbon nanotubes, and multi-walled carbon nanotubes. Diameters of the single-walled carbon nanotube are in an approximate range from 0.5 nanometers to 50 nanometers. Diameters of the double-walled carbon nanotube are in an approximate range from 1 nanometer to 50 nanometers. Diameters of the multi-walled carbon nanotube are in an approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

Further in the present embodiment, the substrate 22 is rectangular, and has a first surface 221 and a second surface 222 opposite to the first surface 221. The substrate 22 is made of glass. The electrodes 28 are made of conductive silver paste.

In step (b), since the carbon nanotube array has a high purity and a high specific surface area, the carbon nanotube array is adherent in nature, the substrate 22 can be firmly adhered to the array of carbon nanotubes. In the present embodiment, the transparent conductive layer can be formed by two methods. The first method for making the transparent conductive layer includes the steps of: (b1) providing a pressing device and an element, pressing the array of carbon nanotubes on the element to form a carbon nanotube film; (b2) separating the carbon nanotube film and the element; (b3) cutting the carbon nanotube film into the size of the substrate 22; and (b4) adhering the cut carbon nanotube film on the substrate 22. The second method for making the transparent conductive layer includes the steps of: (b1') placing the first surface 221 of the substrate 22 on the array of carbon nanotubes; (b2') using the pressing device to press an opposite second surface 222 of the substrate 22, to form a carbon nanotube film thereon; and (b3') cutting away residual carbon nanotube film and thus forming the carbon nanotube structure on the substrate 22.

In step (b), a predetermined pressure can, be applied to the array of carbon nanotubes by the pressing device. In the process of pressing, the carbon nanotubes in the array of carbon nanotubes form the carbon nanotube film under pressure. The carbon nanotubes are nearly all parallel to a surface of the carbon nanotube film. In step (b2'), when the pressing device is used to press the opposite surface of the substrate 22, the array of carbon nanotube departs from the growing substrate, and thus a carbon nanotube film is formed and adhered on the first surface 221 of the substrate 22. Understandably, when the substrate 22 is flexible, the desired carbon nanotube film can be obtained.

Figure 4:
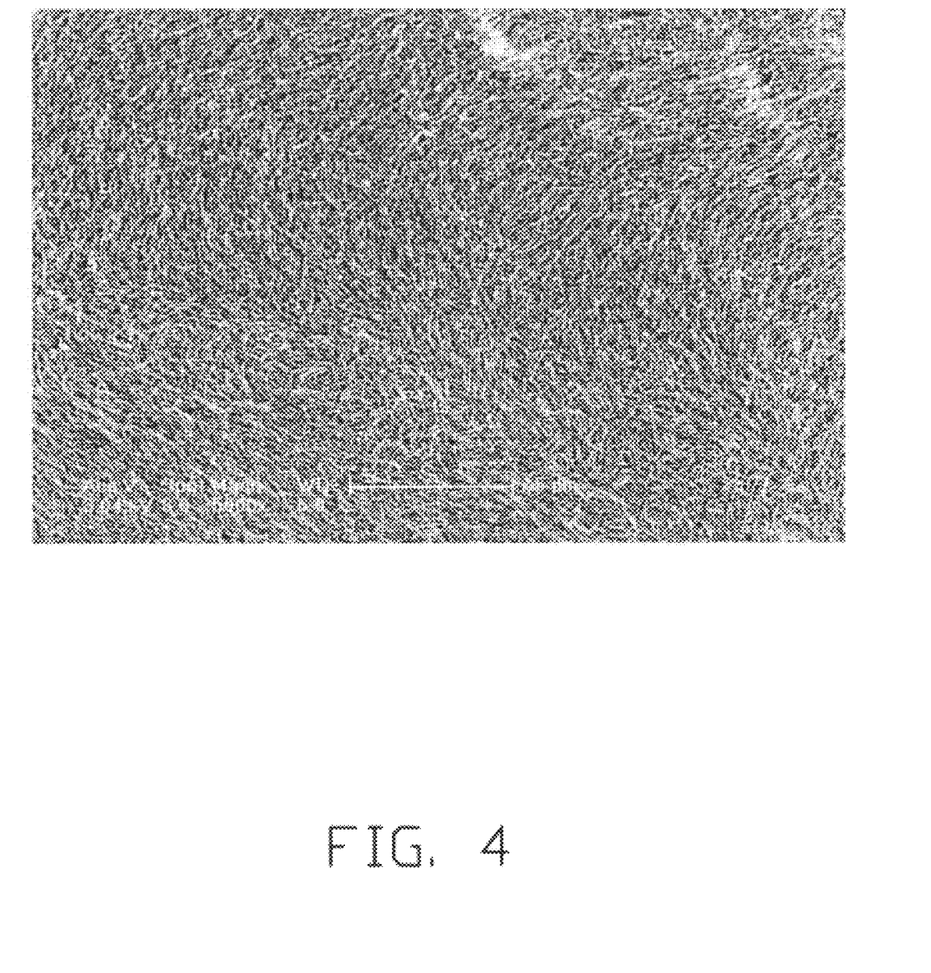
FIG. 4 shows Scanning Electron Microscope (SEM) image of an isotropy carbon nanotube film acquired by the present embodiment.
Figure 5:
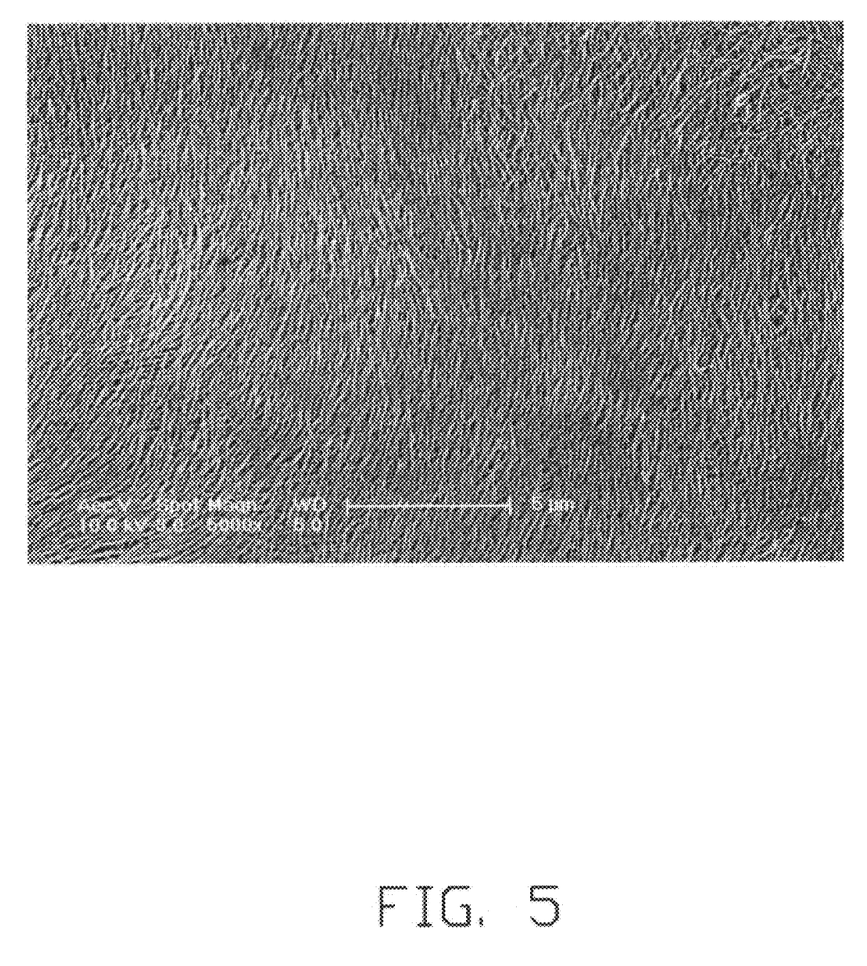
FIG. 5 shows Scanning Electron Microscope (SEM) image of a carbon nanotube film, the carbon nanotubes therein being arranged in a preferred orientation, acquired by the present embodiment.

In the present embodiment, the pressing device can, advantageously, be a pressure head. The pressure head has a glossy surface. It is to be understood that, the shape of the pressure head and the pressing direction can, opportunely, determine the direction of the carbon nanotubes arranged therein. Specifically, referring to FIG. 4, when a planar pressure head is used to press the array of carbon nanotubes along the direction perpendicular to the substrate, a carbon nanotube film having a plurality of carbon nanotubes isotropically arranged can be obtained. Referring to FIG. 5, when a roller-shaped pressure head is used to press the array of carbon nanotubes along a fixed direction, a carbon nanotube film having a plurality of carbon nanotubes aligned along a general direction is obtained. When a roller-shaped pressure head is used to press the array of carbon nanotubes along different directions, a carbon nanotube film having a plurality of carbon nanotubes aligned along different directions is obtained.

Understandably, in the process of pressing, the carbon nanotubes will bend/fall over on the substrate 22, thereby forming a carbon nanotube film having a free-standing structure with slanted carbon nanotubes. The carbon nanotubes in the free-standing structure are nearly all parallel to a surface of the carbon nanotube film, and are isotropically arranged, arranged along a same direction, or arranged along different directions.

In the present embodiment, each carbon nanotube structure includes a single carbon nanotube film. It is to be understood that, a degree of the slant of the carbon nanotubes in the carbon nanotube film is related to the pressure. The greater the pressure, the greater the degree of slant. An angle α between the aligned directions of the carbon nanotubes in the carbon nanotube film and the surface of the carbon nanotube film is in a range from 0° to approximately 15°. It can be understood that the angle α relates to the conductive property of the carbon nanotube film. The smaller the angle α, the better the conductive property thereof. A thickness of the carbon nanotube film is opportunely determined by the height of the carbon nanotube array and the pressure. That is, the greater the height of the carbon nanotube array and the less the pressure, the greater the thickness of the carbon nanotube film.

The carbon nanotube structure can include at least two stacked carbon nanotube films. A carbon nanotube structure comprises of stacked films can be made by obtaining two films and placing one on top of the other.

The width of the carbon nanotube film depends on a size of the carbon nanotube array. The length of the carbon nanotube film can be arbitrarily set as desired. In one embodiment, when the substrate is a 4-inch P-type wafer as in the present embodiment, the width of the carbon nanotube film approximately ranges from 0.5 nanometers to 10 centimeters, and the thickness of the carbon nanotube film approximately ranges from 0.5 nanometers to 100 micrometers. The carbon nanotubes in the carbon nanotube film can be selected from a group consisting of single-walled carbon nanotubes, double-walled carbon nanotubes, and multi-layer carbon nanotubes. Diameters of the single-walled carbon nanotube are in an approximate range from 0.5 nanometers to 50 nanometers. Diameters of the double-walled carbon nanotube are in an approximate range from 1 nanometer to 50 nanometers. Diameters of the multi-walled carbon nanotube are in an approximate range from 1.5 nanometers to 50 nanometers.

Unlike previous methods for making an ITO film, the present method does not require a vacuum environment and heat processing, thus, the carbon nanotube structure formed by the pressing method and used as the transparent conductive layer 24 has the advantage of being low cost, environmentally safe, and energy efficient.

Step (c) can be executed by forming two electrodes 28 on the carbon nanotube structure to electrically connect the at least two electrodes 28 with the carbon nanotube structure. Step (c) includes the following steps of: (c1) coating the conductive silver paste on a surface of the carbon nanotube structure via screen printing method or spraying method; (c2) baking the conductive silver paste formed on the carbon nanotube structure in an oven for 10-60 minutes at a temperature in an approximate range from 100° C. to 120° C. to solidify the conductive silver paste, thereby forming the electrodes 28.

Figure 6:
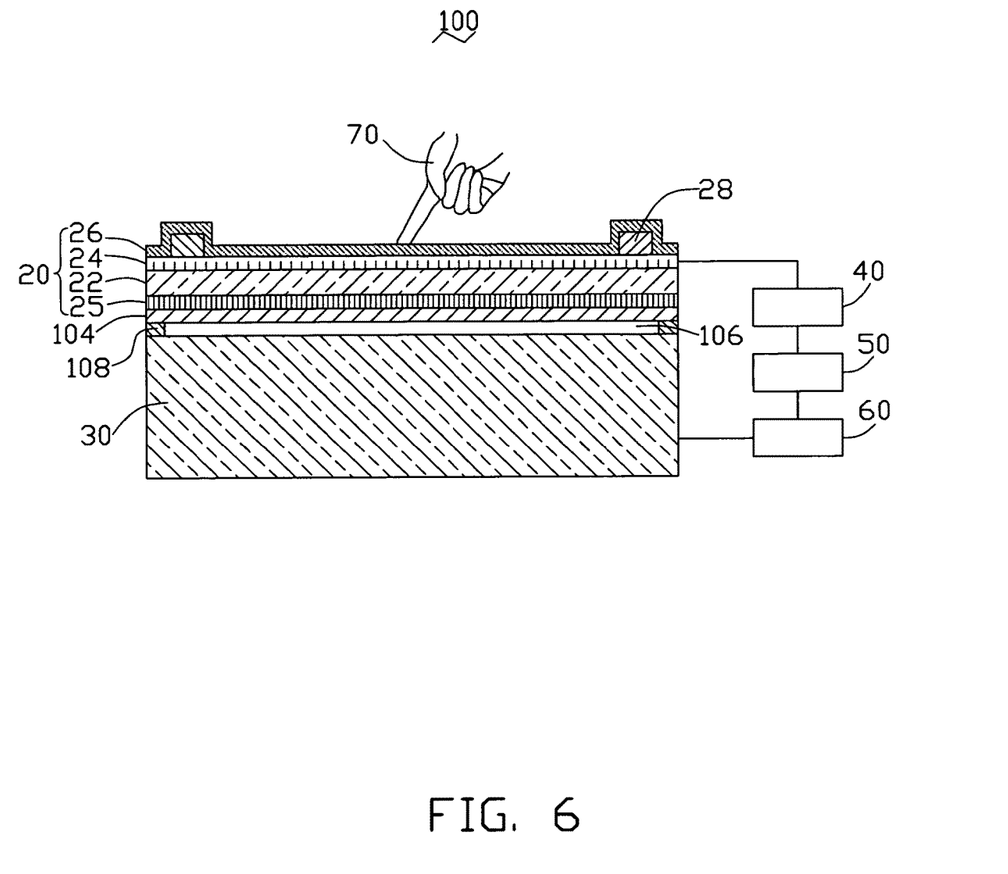
FIG. 6 is a schematic assembled cross-sectional view of the touch panel of the present embodiment used with a display element of a display device Corresponding reference characters indicate corresponding parts throughout the several views. The exemplifications set out herein illustrate at least one embodiment of the present touch panel, method for making the same, and display device adopting the same, in at least one form, and such exemplifications are not to be construed as limiting the scope of the invention in any manner.

Referring to FIG. 6, a display device 100 includes the touch panel 20, a display element 30, a touch panel controller 40, a central processing unit (CPU) 50, and a display element controller 60. The touch panel 20 is connected to the touch panel controller 40 by an external circuit. The touch panel 20 can be spaced at a distance 106 from the display element 30 or, alternatively can be installed directly on the display element 30. The touch panel controller 40, the CPU 50, and the display element controller 60 are electrically connected. The CPU 50 is connected to the display element controller 60 to control the display element 30.

The display element 30 can be, e.g., a liquid crystal display, field emission display, plasma display, electroluminescent display, vacuum fluorescent display, cathode ray tube, or other display device.

When the shielding layer 25 is located on the second surface 222 of the substrate 22, a passivation layer 104 is, beneficially, located on and in contact with a surface of the shielding layer 25 that faces away from the substrate 22. The material of the passivation layer 104 can be silicon nitride, or silicon dioxide. The passivation layer 104 can be spaced from the display element 30 with a distance or, the passivation layer 104 can be directly installed on the display element 30. In some embodiments two spacers 108 are used to make the passivation layer 104 and the display element 30 with a distance 106. The passivation layer 24 can protect the shielding layer 22 from chemical or mechanical damage.

In operation, a voltage is applied to the electrodes 28. A user operates the display device 100 by pressing or touching the transparent protective layer 26 of the touch panel 20 with a touch tool, such as a finger, or an electrical pen/stylus 70, while visually observing the display element 30 through the touch panel 20. In the illustration, the touch tool is the user's finger 70. Due to an electrical field of the user, a coupling capacitance forms between the user and the transparent conductive layer 24. For high frequency electrical current, the coupling capacitance is a conductor, and thus the touch tool 70 takes away a little current from the touch point. Current flowing through the four electrodes 28 cooperatively replace the current lost at the touch point. The quantity of current supplied by each electrode 28 is directly proportional to the distances from the touch point to the electrodes 28. The touch panel controller 40 is used to calculate the proportion of the four supplied currents, thereby detecting coordinates of the touch point on the touch panel 20. Then, the touch panel controller 40 sends the coordinates of the touch point to the CPU 50. The CPU 50 receives and processes the coordinates into a command. Finally, the CPU 50 sends out the command to the display element controller 60. The display element controller 60 controls the display of the display element 30 accordingly.

The properties of the carbon nanotubes provide superior toughness, high mechanical strength, and uniform conductivity to the carbon nanotube film. Thus, the touch panel and the display device using the same adopting the carbon nanotube film are durable and highly conductive. Furthermore, since the carbon nanotubes have excellent electricity conductive property, the carbon nanotube structure formed by a plurality of carbon nanotubes arranged isotropy, along a same direction, or along different directions, has a uniform resistance distribution and thus the touch panel and the display device using the same adopting the carbon nanotube structure have an improved sensitivity and accuracy. Moreover, since the method for making the carbon nanotube film via pressing the carbon nanotube array using a pressing device is simple, without vacuum or heating processes, the touch panel and the display device using the same adopting the carbon nanotube film are low cost.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A touch panel comprising:
   a substrate;
   a transparent conductive layer located on a surface of the substrate comprising a carbon nanotube structure comprised of carbon nanotubes, and the carbon nanotubes in the carbon nanotube structure being arranged isotropically, arranged along a same direction, or arranged along different directions, an angle between a primary alignment direction of the carbon nanotubes in the carbon nanotube structure and a surface of the carbon nanotube structure in contact with the substrate being greater than 0° and smaller than 15°; and
   at least two separate electrodes electrically connected with the transparent conductive layer.

2. The touch panel as claimed in claim 1, wherein groups of the carbon nanotubes in the carbon nanotube structure are joined end to end by van der Waals attractive force between the ends.

3. The touch panel as claimed in claim 1, wherein the carbon nanotubes in the carbon nanotube structure are selected from the group consisting of single-walled carbon nanotubes, double-walled carbon nanotubes, and multi-walled carbon nanotubes; and a diameter of the single-walled carbon nanotubes approximately ranges from 0.5 nanometers to 50 nanometers, a diameter of the double-walled carbon nanotubes approximately ranges from 1 nanometer to 50 nanometers, and a diameter of the multi-walled carbon nanotube approximately ranges from 1.5 nanometers to 50 nanometers.

4. The touch panel as claimed in claim 1, wherein the at least two electrodes are separately located on a surface of the transparent conductive layer, and the electrodes comprise metal.

5. The touch panel as claimed in claim 4, wherein the electrodes are adhered to the surface of the transparent conductive layer using a silver-substrated slurry.

6. The touch panel as claimed in claim 1, further comprising a transparent protective layer located on a surface of the transparent conductive layer, and a material of the transparent protective layer is selected from the group consisting of silicon nitride, silicon dioxide, benzocyclobutenes, polyester film, and polyethylene terephthalate.

7. The touch panel as claimed in claim 1, further comprising a shielding layer located on a surface of the substrate away from the transparent conductive layer, and a material of the shielding layer is selected from the group consisting of indium tin oxides, antimony tin oxides, and carbon nanotube films.

8. A display device comprising:
   a touch panel comprising:
      a substrate;
      a transparent conductive layer, located on a surface of the substrate and to detect coordinates of a touch point by detecting coupling capacitances, consisting of a carbon nanotube structure consisting of carbon nanotubes, and the carbon nanotubes in the carbon nanotube structure being arranged isotropically, arranged along a same direction, or arranged along different directions; and
      at least two separate electrodes electrically connected with the transparent conductive layer; and
   a display element positioned adjacent to the touch panel.

9. The display device as claimed in claim 8, further comprising a touch panel controller, a central processing unit, and a display element controller electrically connected with each other, the touch panel controller being connected to the touch panel, and the display element controller being connected to the display element.

10. The display device as claimed in claim 8, wherein the display element is selected from the group consisting of liquid crystal displays, field emission displays, plasma displays, electroluminescent displays, vacuum fluorescent displays, and cathode ray tubes.

11. The display device as claimed in claim 8, wherein the touch panel is spaced from the display element with a distance.

12. The display device as claimed in claim 8, wherein the touch panel is located on the display element.

13. The display device as claimed in claim 8, further comprising a passivation layer located on a surface of the touch panel, and the material of the passivation layer being selected from the group consisting of silicon nitride and silicon dioxide.

14. The touch panel as claimed in claim 8, wherein the carbon nanotubes in the carbon nanotube structure are substantially parallel to a surface of the carbon nanotube structure in contact with the substrate.

15. The touch panel as claimed in claim 8, wherein an angle between a primary alignment direction of the carbon nanotubes in the carbon nanotube structure and a surface of the carbon nanotube structure in contact with the substrate is in a range from about 0° to about 15°.

16. The touch panel as claimed in claim 1, wherein the at least two electrodes comprises four electrodes separately located on four sides of a surface of the transparent conductive layer.

* * * * *